(12) United States Patent
Hallam et al.

(10) Patent No.: US 11,037,142 B2
(45) Date of Patent: Jun. 15, 2021

(54) SYSTEMS AND METHODS FOR THE APPLICATION OF DISTRIBUTED LEDGERS FOR NETWORK PAYMENTS AS FINANCIAL EXCHANGE SETTLEMENT AND RECONCILIATION

(71) Applicant: JPMorgan Chase Bank, N.A., New York, NY (US)

(72) Inventors: Jonathan C. Hallam, Dorset (GB); Naveen Mallela, Singapore (SG); Gavin Lonsdale, Hampshire (GB); Lawrence Charles Drake, Bournemouth (GB); Sai Murali Krishna Valiveti, Singapore (SG); Elizabeth Polanco Aquino, Brooklyn, NY (US); David Voell, Little Silver, NJ (US); Suresh Shetty, Monmouth Junction, NJ (US); Samer Falah, Staten Island, NY (US); William J. Lee, Lithia, FL (US); Leticia Pui Sze Lim, New York, NY (US); Luciane Sant'Anna, Brandon, FL (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 113 days.

(21) Appl. No.: 15/797,602

(22) Filed: Oct. 30, 2017

(65) Prior Publication Data
US 2018/0121911 A1 May 3, 2018

Related U.S. Application Data

(60) Provisional application No. 62/414,398, filed on Oct. 28, 2016.

(51) Int. Cl.
*G06Q 20/38* (2012.01)
*G06Q 20/10* (2012.01)
(Continued)

(52) U.S. Cl.
CPC ........... *G06Q 20/389* (2013.01); *G06F 16/27* (2019.01); *G06Q 20/10* (2013.01); *G06Q 20/102* (2013.01);
(Continued)

(58) Field of Classification Search
CPC ...... G06Q 20/389; G06Q 20/10; G06Q 20/42; G06Q 20/223; G06Q 20/38; G06Q 20/32;
(Continued)

(56) References Cited

U.S. PATENT DOCUMENTS

| 8,386,394 B1 | 2/2013 | Nguyen et al. |
| 2002/0133409 A1† | 9/2002 | Sawano et al. |

(Continued)

FOREIGN PATENT DOCUMENTS

| WO | WO 2015/175854 | 11/2015 |
| WO | WO 2015/183497 | 12/2015 |

(Continued)

OTHER PUBLICATIONS

U.S. Appl. No. 15/233,719, filed Aug. 2016, Hanrahan et al.
(Continued)

*Primary Examiner* — Scott C Anderson
*Assistant Examiner* — Marla Hudson
(74) *Attorney, Agent, or Firm* — Greenberg Traurig LLP

(57) ABSTRACT

Systems and methods for the application of distributed ledgers for network payments as financial exchange settlement and reconciliation are disclosed. In one embodiment, a method for processing network payments using a distributed ledger may include: (1) a payment originator initiating a payment instruction to a payment beneficiary; (2) a payment originator bank posting and committing the payment instruction to a distributed ledger on a peer-to-peer network; (3) the payment beneficiary bank posting and committing the payment instruction to the distributed ledger on a peer-to-peer
(Continued)

network; and (4) the payment originator bank validating and processing the payment through a payment originator bank internal system and debiting an originator account.

13 Claims, 3 Drawing Sheets

(51) Int. Cl.
*G06Q 20/42* (2012.01)
*G06Q 20/22* (2012.01)
*G06F 16/27* (2019.01)

(52) U.S. Cl.
CPC ........... *G06Q 20/223* (2013.01); *G06Q 20/42* (2013.01); *G06Q 2220/00* (2013.01)

(58) Field of Classification Search
CPC .. G06Q 20/102; G06Q 2220/00; G06F 17/30; G06F 21/64; G06F 21/60; G06F 2221/2139; G06F 16/27; G06F 16/273; G06F 16/275; G06F 16/278
USPC ...................................................... 705/1, 40
See application file for complete search history.

(56) References Cited

U.S. PATENT DOCUMENTS

| | | | |
|---|---|---|---|
| 2006/0212391 | A1† | 9/2006 | Norman et al. |
| 2014/0344156 | A1 | 11/2014 | Hilt et al. |
| 2015/0310476 | A1 | 10/2015 | Gadwa |
| 2016/0260169 | A1 | 8/2016 | Arnold et al. |
| 2016/0292680 | A1 | 10/2016 | Wilson et al. |
| 2017/0148016 | A1* | 5/2017 | Davis ................. G06Q 20/3827 |
| 2017/0236102 | A1† | 8/2017 | Biton |
| 2018/0247302 | A1* | 8/2018 | Armstrong ......... G06Q 20/3827 |

FOREIGN PATENT DOCUMENTS

WO  WO 2016/032567       3/2016
WO       2017/027900 A1 †  2/2017

OTHER PUBLICATIONS

U.S. Appl. No. 15/234,263, filed Aug. 2016, Vieira et al.
U.S. Appl. No. 15/298,328, filed Oct. 2016, Zwink et al.
Ripple Forum, "The Future of Payments" [on line], Jul. 3, 2015 [retrieved Dec. 29, 2017], Retrieved from Internet: URL:https://forum.ripple.com/viewtopic.php?f=1&t=10597, pp. 1-8.
International Search Report and Written Opinion, International Application No. PCT/US17/59015, dated Jan. 17, 2018, pp. 1-19.

\* cited by examiner
† cited by third party

SYSTEMS AND METHODS FOR THE APPLICATION OF DISTRIBUTED LEDGERS FOR NETWORK PAYMENTS AS FINANCIAL EXCHANGE SETTLEMENT AND RECONCILIATION

RELATED APPLICATIONS

The present application claims priority to U.S. Provisional Patent Application Ser. No. 62/414,398, filed Oct. 28, 2016, the disclosure of which is hereby incorporated, by reference, in its entirety.

BACKGROUND OF THE INVENTION

1. Field of the Invention

The present invention generally relates to systems and methods for the application of distributed ledgers for network payments as financial exchange settlement and reconciliation.

2. Description of the Related Art

Distributed ledgers, such as Blockchain, provide a unique system for recording transactions and storing data. In general, distributed ledgers hold a log of transactions (events) that may be replicated across a public or private distributed network. Cryptography and digital signatures may be used to determine valid parties and transactions such that all parties/observers agree on the order and state of the ledger in real-time without having to rely on a trusted third party to hold the true "golden copy." The distributed ledger thus provides a practically immutable, verifiably true audit trail.

FIG. 1 depicts a conventional system and method for cross-border payments processing. For a cross-border payment to be made from a payment organization to a payment beneficiary, a number of messages must be sent between the banks and clearing houses involved in processing the transaction. This often results in a slow transaction, as there are may be delays in service due to correspondent banking, messaging networks, and clearing intermediaries in the payment flow. The transaction may also be expensive, as there are duplicative reconciliation and reporting costs across participants and within banks to enable transparency and payment tracking. There is a restricted availability to the funds, as real-time settlement of payments is not possible. And, the transactions may be risky as there are counterparty and settlement risks associated with correspondent banking network.

SUMMARY OF THE INVENTION

Systems and methods for the application of distributed ledgers for network payments as financial exchange settlement and reconciliation are disclosed. In one embodiment, a method for processing network payments using a distributed ledger may include: (1) a payment originator initiating a payment instruction to a payment beneficiary; (2) a payment originator bank posting and committing the payment instruction to a distributed ledger on a peer-to-peer network; (3) the payment beneficiary bank posting and committing the payment instruction to the distributed ledger on a peer-to-peer network; and (4) the payment originator bank validating and processing the payment through a payment originator bank internal system and debiting an originator account.

In one embodiment, the transaction may be a confirmed transaction or an in-flight transaction.

In one embodiment, the method may further include the payment originator bank validating and processing the payment through a payment originator bank internal system and debiting an originator account.

In one embodiment, the step of the payment beneficiary bank executing the payment to the payment beneficiary may include the payment beneficiary bank validating and processing the payment instruction through a payment beneficiary bank internal system and crediting a beneficiary account.

In one embodiment, the method may further include the payment originator bank posting and committing the payment instruction to an internal non-distributed ledger. In one embodiment, the distributed ledger may include an account structure that replicates an account structure on the internal non-distributed ledger. In one embodiment, the payment beneficiary bank may also commit the payment instruction to an internal non-distributed ledger.

In one embodiment, the distributed ledger and the internal non-distributed ledger may be synchronized.

In one embodiment, the payment transaction may be an inter-bank payment transaction, and the payment originator bank and payment beneficiary bank may not be associated with the same financial institution.

In one embodiment, the payment transaction may be conducted in a single currency. In another embodiment, the payment transaction may comprise a currency conversion. In one embodiment, the payment transaction is conducted in a single currency. In another embodiment, the payment transaction comprises a currency conversion.

According to another embodiment, a system for processing network payments using a distributed ledger may include a payment originator bank; a payment beneficiary bank; a peer-to-peer payment network, wherein the payment originator bank and the payment beneficiary bank are participant members of the peer-to-peer payments network; and a distributed ledger. The payment originator bank may validate and process a payment through a payment originator bank internal system and debits an originator account. The payment originator bank may post a payment instruction on a distributed ledger on the payment peer-to-peer network. The payment beneficiary bank may validate and process the payment instruction through a payment beneficiary bank internal system and credits a beneficiary account. The payment beneficiary bank may post a final transaction confirmation to the distributed ledger on the peer-to-peer network.

In one embodiment, the payment beneficiary bank may confirm the payment transaction comparing the payment transaction on the distributed ledger to the credit to the beneficiary account.

In one embodiment, the system may further include an internal non-distributed ledger for the payment originator bank, and the payment originator bank may post and commit the payment instruction to the internal non-distributed ledger.

In one embodiment, the distributed ledger may include an account structure that replicates an account structure on the internal non-distributed ledger. In one embodiment, the distributed ledger and the internal non-distributed ledger may be synchronized.

In one embodiment, the payment originator bank and the payment beneficiary bank may be associated with the same financial institution.

In one embodiment, the payment transaction may be an inter-bank payment transaction, and the payment originator bank and payment beneficiary bank may not be associated with the same financial institution.

In one embodiment, the payment transaction is conducted in a single currency. In another embodiment, the payment transaction comprises a currency conversion.

In one embodiment, the transaction may be an unconfirmed transaction.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

The following documents are hereby incorporated by reference in their entireties: U.S. patent application Ser. Nos. 62/340,295; 62/232,989; 62/316,841; 15/233,719; 15/234,263; 15/332,025; and 15/298,328.

Embodiments disclosed herein relate generally to systems and methods for the application of distributed ledgers for network payments as financial exchange settlement and reconciliation. In one embodiment, a distributed ledger may be used for some or all of the following: intra-branch clearing for self-clearing currency; intra-branch clearing for third party nostro clearing currency; interbank clearing for self-clearing currency; interbank clearing with correspondent bank; cross-currency flows for high value; cross-currency flows for low value; processing window extension to 24×7 hours, 365 days; etc.

In one embodiment, the distributed ledger may store, in real-time or substantially in real-time, postings sourced from a payment processing system, a middleware communication application, or a traditional, non-distributed ledger.

If the non-distributed ledger is unavailable, the distributed ledger may initiate processing of payment or transaction requests from upstream systems, and hold these transactions as unconfirmed postings in the distributed ledger. Once the non-distributed ledger is available, the distributed ledger may forward and/or share all the posting requests to the non-distributed ledger so that the postings can be moved from an unconfirmed state to a confirmed state.

In one embodiment, the overall flow allows tracking of any network payments between financial institution entities on an end-to-end basis.

In one embodiment, the use of a distributed ledger provides the ability to confirm that all postings related to a network payment have been successful across the financial institution entities in one consolidated posting across multiple financial institution entities and branches, instead of in many separate instances.

In one embodiment, the distributed ledger may hold a consolidated view of postings for payments and/or transactions, such as network payments, and may further permit confirmation that the initial debit and final credit to the involved accounts were successfully processed.

In one embodiment, the distributed ledger may hold a consolidated view of postings for payments and/or transactions, such as network payments, across multiple financial institution entities and branches outside the operating hours of the non-distributed ledger.

In one embodiment, the distributed ledger may provide the consolidated view of postings for payments and/or transactions, such as network payments, across multiple financial institution entities and branches at the opening hours of the non-distributed ledger.

Figure 1:
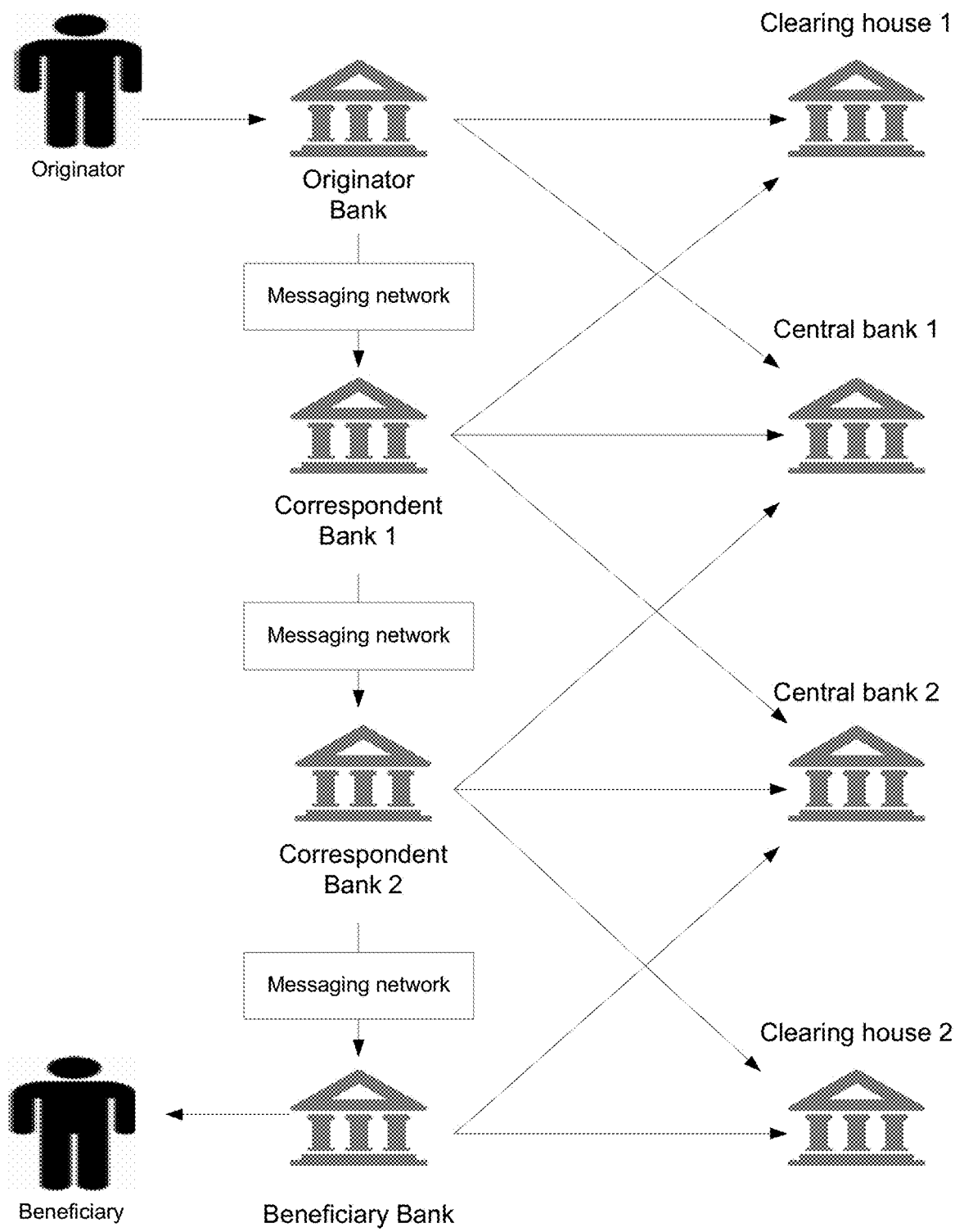
FIG. 1 depicts a conventional system for financial exchange settlement and reconciliation.
Figure 2:
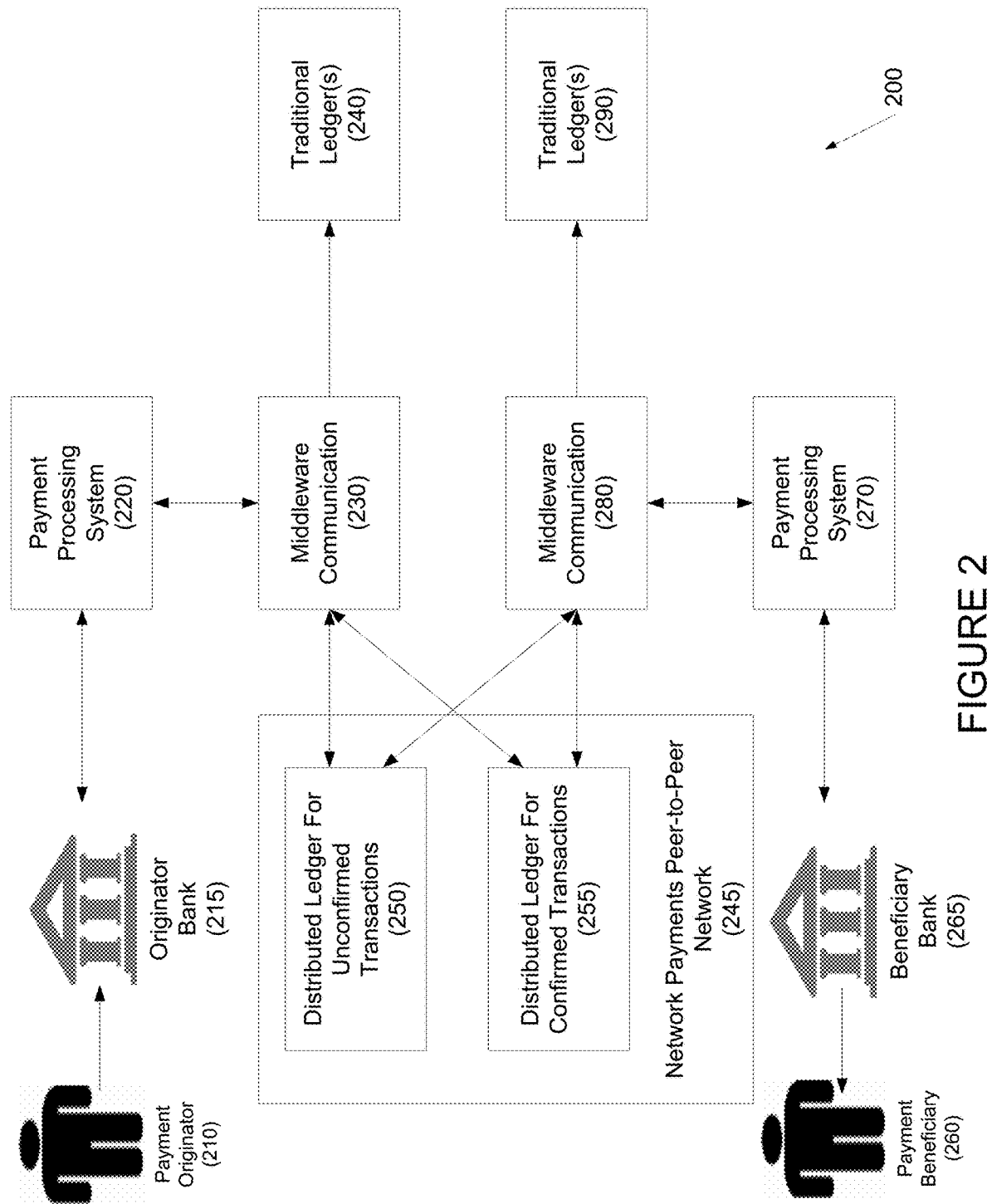
FIG. 2 depicts a system for the application of distributed ledgers for network payments as financial exchange direct settlement and reconciliation between participants of a peer-to-peer network according to one embodiment.

Referring to FIG. 2, a system for the application of distributed ledgers for financial exchange settlement and reconciliation is provided according to one embodiment. System 200 may include payment originator 210, which may send a payment instruction to originator bank 215 to initiate a network payment to payment beneficiary 260. In one embodiment, payment originator 210 and payment beneficiary 260 may be in the same country, holding accounts denominated in the same currency. In another embodiment, payment originator 210 and payment beneficiary 260 may be in different countries, holding accounts denominated in different currencies.

Payment originator bank 215 may be payment originator 210's bank, and may serve as a source of funds. Payment beneficiary bank 265 may be payment beneficiary 260's bank, and may receive the funds. In one embodiment, payment originator bank 215 and payment beneficiary bank 265 may be one single branch of the same financial institution. In another embodiment, they may be different branches of the same financial institution. In another embodiment, they may be different legal entities associated with the same financial institution (e.g., different countries associated with the same financial institution). In another embodiment, they may be associated with different financial institutions.

In one embodiment, payment originator bank 215 and payment beneficiary bank 265 may be correspondent banks, vendors, etc.

In one embodiment, originator bank 215 may processes payment originator 210's network payment instruction through its payment processing system 220 to validate the transaction, which may then be posted to its middleware communication application 230.

In one embodiment, originator bank 215 middleware communication application 230 may route postings of unconfirmed, or in-flight, network payments to both its traditional, non-distributed ledger 240 and to the peer-to-peer network 245 distributed ledger for unconfirmed transactions 250.

In one embodiment, originator bank 215 middleware communication application 230 may route postings of confirmed, final network payments to both its traditional, non-distributed ledger 240 and to the peer-to-peer network 245 distributed ledger for confirmed transactions 255.

In one embodiment, payment originator bank 215 and payment beneficiary 265 bank may be part of the same peer-to-peer network 245 and may communicate with distributed ledgers 250 and 255. In one embodiment, distributed ledgers 250 and 255 may be Ethereum-based ledgers, Blockchain-based ledgers, or any other suitable protocol ledger, where distributed ledger 250 holds records of unconfirmed, or in-flight, network payments and distributed ledger 255 holds records of confirmed, final network payments.

In one embodiment, each of payment originator bank 215, payment beneficiary 265 bank, and payment network 245 may maintain a copy of distributed ledgers 250 and 255.

In one embodiment, beneficiary bank 265 may receive a network payment instruction posted by originator bank 215 to distributed ledger for unconfirmed transactions 250. In one embodiment, beneficiary bank 265 may process the payment instruction through its payment processing system 270 to validate the transaction, which may then be posted to its middleware communication application 280.

In one embodiment, beneficiary bank 265 middleware communication application 280 may route postings of unconfirmed, or in-flight, network payments to one or both of its traditional, non-distributed ledger 290 and to the peer-to-peer network 245 distributed ledger for unconfirmed transactions 250.

In one embodiment, beneficiary bank 265 middleware communication application 280 may route postings of confirmed, final network payments to both its traditional, non-distributed ledger 290 and to the peer-to-peer network 245 distributed ledger for confirmed transactions 255.

In one embodiment, distributed ledgers 250 and 255 may replicate account structures from traditional, non-distributed ledgers 240 and 290.

Figure 3:
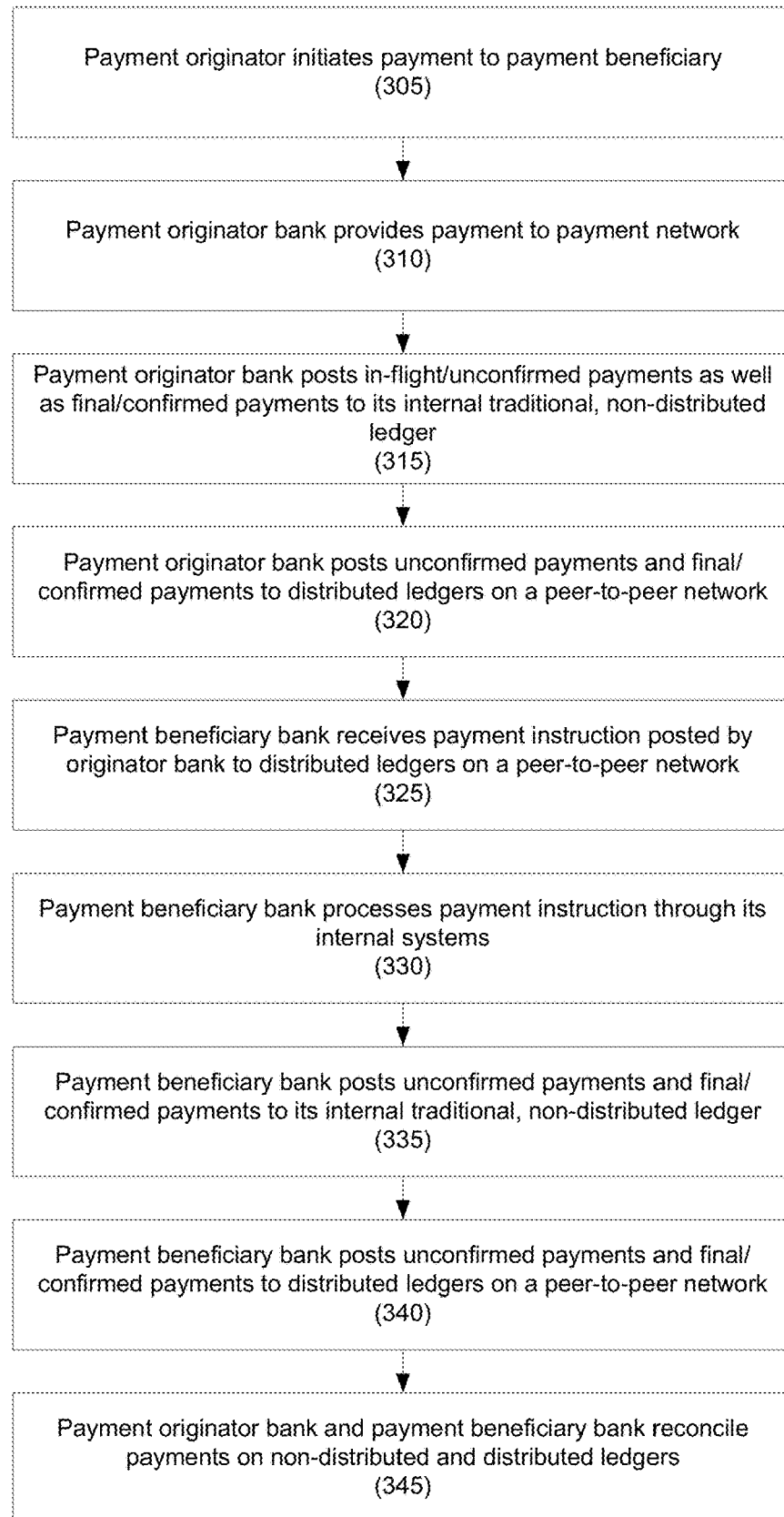
FIG. 3 depicts a method for the application of distributed ledgers for network payments as financial exchange settlement and reconciliation according to one embodiment.

Referring to FIG. 3, a method for the application of distributed ledgers for network payments as financial exchange settlement and reconciliation according to one embodiment. In step 305, a payment originator may initiate a payment to a payment beneficiary using, for example, the payment originator's bank. The payment may be in the same currency or in a different currency, in the same country or in different countries.

In one embodiment, the payment originator bank and the payment beneficiary bank may be part of the same financial institution, may be different branches of the same financial institution, may be different legal entities associated with the same financial institution (e.g., different countries associated the same financial institution), or they may be associated with different financial institutions.

In step 310, the payment originator bank may validate and process the payment through its internal applications.

In step 315, the payment originator bank may post unconfirmed and final payments to its internal non-distributed ledger.

In step 320, the payment originator bank may be a participant of a peer-to-peer network, and may post unconfirmed and final payments to distributed ledgers on this peer-to-peer network.

In one embodiment, the transaction may be first posted to the non-distributed ledger, and then the confirmed posting may be sent to the distributed ledger for processing.

In one embodiment, if a non-distributed ledger is not available, the transaction may be posted to the distributed ledger for processing. The distributed ledger may hold these postings as unconfirmed postings and respond to the payment network. The distributed ledger may continue to process transactions until the non-distributed ledger becomes available again, at which time it may forward all unconfirmed postings to the non-distributed ledger for processing.

In step 325, the payment beneficiary bank may be a participant of the same peer-to-peer network, and may receive the payment instruction posted by the payment originator bank to the distributed ledgers on the peer-to-peer network.

In step 330, the payment beneficiary bank may validate and process the payment instruction through its internal applications.

In step 335, the beneficiary bank may post unconfirmed and final payments to its internal non-distributed ledger.

In step 340, the beneficiary bank may post unconfirmed and final payments to distributed ledgers on the peer-to-peer network.

In one embodiment, both originator's and beneficiary bank's internal systems may send periodic data feeds to downstream systems for intraday reporting, regulatory reporting and general ledger update purposes, as part of, for example, steps 310 and 330.

In step 345, the distributed ledgers and non-distributed ledgers may be reconciled. This may be performed continuously, periodically, or on a demand basis. In one embodiment, the distributed ledger and non-distributed ledger may, in real-time or substantially in real-time, provide a report of all postings for a given a period seen for the parties, entities, branches, etc. in scope. The report may identify any exceptions or any unreconciled postings.

In one embodiment, the end state of the distributed ledger may be the primary book of records for payment transactions and settlements among different participants of the peer-to-peer network.

It should be recognized that although several embodiments have been disclosed, these embodiments are not exclusive and aspects of one embodiment may be applicable to other embodiments.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS™ operating system, the OS X™ operating system, the Android™ operating system, the Microsoft Windows™ operating systems, the Unix™ operating system, the Linux™ operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Go Lang, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for processing network payments using a distributed ledger, comprising:
    a payment originator initiating a payment instruction to a payment beneficiary with a payment originator bank;
    the payment originator bank validating the payment instruction;
    a middleware communication application at the payment originator bank determining that an internal payment originator bank non-distributed banking ledger is unavailable;
    the middleware communication application posting the payment instruction to a distributed ledger on a peer-to-peer network as an unconfirmed payment instruction;
    the middleware communication application determining that the internal payment originator bank non-distributed banking ledger is available;
    the middleware communication application at the payment originator bank posting and committing the payment instruction to the internal payment originator bank non-distributed banking ledger as a confirmed payment instruction;
    the middleware communication application at the payment originator bank posting and committing the confirmed payment instruction to a distributed ledger on a peer-to-peer network;
    wherein a middleware communication application at a payment beneficiary bank receives the confirmed payment instruction from the distributed ledger on the peer-to-peer network;
    wherein the middleware communication application at the payment beneficiary bank posts the confirmed payment instruction to an internal payment beneficiary bank non-distributed banking ledger as a credit to a payment beneficiary account;
    wherein the middleware communication application at the payment beneficiary bank posts and commits acknowledgment of the confirmed payment instruction to the distributed ledger on the peer-to-peer network; and
    wherein the payment originator bank and the payment beneficiary bank reconcile the internal payment originator bank non-distributed banking ledger and the internal payment beneficiary bank non-distributed banking ledger with the distributed ledger on the peer-to-peer network.

2. The method of claim 1, further comprising:
    the payment beneficiary bank validating and processing the payment instruction through a payment beneficiary bank internal system and crediting a beneficiary account.

3. The method of claim 1, wherein the distributed ledger comprises an account structure that replicates an account structure on one of the internal banking non-distributed ledgers.

4. The method of claim 1, wherein the payment instruction is for an inter-bank payment transaction, and the payment originator bank and payment beneficiary bank are not associated with the same financial institution.

5. The method of claim 1, wherein the payment instruction is conducted in a single currency.

6. A system for processing network payments using a distributed ledger, comprising:
    a payment originator bank comprising:
        a payment originator bank middleware communication application; and
        an internal payment originator bank non-distributed banking ledger;
    a payment beneficiary bank comprising:
        a payment beneficiary bank middleware communication application;
        an internal payment beneficiary bank non-distributed banking ledger;
    a peer-to-peer payment network, wherein the payment originator bank and the payment beneficiary bank are participant members of the peer-to-peer payments network; and a distributed ledger;
wherein:
- the payment originator bank initiates a payment instruction;
- the payment originator bank middleware communication application posts and commits the payment instruction to the internal payment originator bank non-distributed banking ledger as a debit to a payment originator account;
- the payment originator bank middleware communication application determines that the internal payment originator bank non-distributed banking ledger is unavailable;
- the payment originator bank middleware communication application posts the payment instruction to a distributed ledger on a peer-to-peer network as an unconfirmed payment instruction;
- the payment originator bank middleware communication application determines that the internal payment originator bank non-distributed banking ledger is available;
- the payment originator bank middleware posts and commits the payment instruction to the internal payment originator bank non-distributed banking ledger as a confirmed payment instruction;
- the payment beneficiary bank middleware communication application receives the payment instruction from the distributed ledger on the peer-to-peer network;
- the payment beneficiary bank middleware communication application posts the payment instruction to an internal payment beneficiary bank non-distributed banking ledger as a credit to a payment beneficiary account;
- the payment beneficiary bank middleware communication application posts an acknowledgment of the payment instruction to the distributed ledger on the peer-to-peer network; and
- the payment beneficiary bank reconcile the internal payment originator bank non-distributed banking ledger and the internal payment beneficiary bank non-distributed banking ledger with the distributed ledger on the peer-to-peer network.

7. The system of claim 6, wherein the payment beneficiary bank confirms the payment instruction by comparing the payment instruction on the distributed ledger to the credit to the beneficiary account.

8. The system of claim 6, wherein the distributed ledger comprises an account structure that replicates an account structure on one of the internal banking non-distributed ledgers.

9. The system of claim 6, wherein the payment originator bank and the payment beneficiary bank are associated with the same financial institution.

10. The system of claim 6, wherein the payment instruction is an inter-bank payment transaction, and the payment originator bank and payment beneficiary bank are not associated with the same financial institution.

11. The system of claim 6, wherein the payment instruction is conducted in a single currency.

12. The system of claim 6, wherein the payment instruction comprises a currency conversion.

13. The system of claim 6, wherein the payment instruction is an unconfirmed transaction.

* * * * *